(12) United States Patent
Muralidhar et al.

(10) Patent No.: US 8,601,304 B2
(45) Date of Patent: Dec. 3, 2013

(54) METHOD, APPARATUS AND SYSTEM TO TRANSITION SYSTEM POWER STATE OF A COMPUTER PLATFORM

(75) Inventors: Rajeev D. Muralidhar, Bangalore (IN); Harinarayanan Seshadri, Bangalore (IN); Bruce L. Fleming, Morgan Hill, CA (US); Vishwesh M. Rudramuni, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/077,882

(22) Filed: Mar. 31, 2011

(65) Prior Publication Data

US 2012/0166843 A1 Jun. 28, 2012

(30) Foreign Application Priority Data

Dec. 23, 2010 (IN) .......................... 3083/DEL/2010

(51) Int. Cl.
*G06F 1/00* (2006.01)
(52) U.S. Cl.
USPC ........................................................ 713/323
(58) Field of Classification Search
None
See application file for complete search history.

(56) References Cited

U.S. PATENT DOCUMENTS

| | | | |
|---|---|---|---|
| 6,317,839 B1 | 11/2001 | Wells | |
| 6,802,018 B2 | 10/2004 | Bormann et al. | |
| 2005/0010828 A1 | 1/2005 | Oh | |
| 2008/0098245 A1* | 4/2008 | Hogan et al. | 713/323 |
| 2009/0313492 A1 | 12/2009 | Lerman | |
| 2010/0275045 A1 | 10/2010 | Qin et al. | |
| 2011/0264934 A1* | 10/2011 | Branover et al. | 713/320 |
| 2012/0102344 A1* | 4/2012 | Kocev et al. | 713/322 |

OTHER PUBLICATIONS

Brown, "Suspend-to-RAM in Linux, Reprinted from the Proceedings of the Linux Symposium, Jul. 23-26, 2008, Ottawa, Ontario Canada,", 16 pages.
Muralidhar, et al., "India Patent Application No. 2508/DEL/2010, entitled: Fine Grained Power Management in Virtualized Mobile Platforms, filed Oct. 21, 2010", Whole Document.
Shimpi, Anand L., "OS Driven Power Management, Intel Unveils Moorestown and the Atom Z600, The Fastest Smartphone Platform?, AnandTech, http://www.anandtech.com/show/3696/intel-moorestown-and-the-atom-z600-series-the-fastest-smartphone-processor/11, May 4, 2010", Whole Document.
Shimpi, Anand, L., "Power Gating, Intel Unveils Moorestown and the Atom Z600, The Fastest Smartphone Platform?, http://www.anandtech.com/show/3696/intel-unveils-moorestown-and-the-atom-z600-series-the-fastest-smartphone-processor/10, AnandTech, May 4, 2010". Whole Document.
"International Search Report and Written Opinion of the International Searching Authority for Application No. PCT/US2011/063907", (Jun. 26, 2012), Whole Document.

* cited by examiner

*Primary Examiner* — Thomas Lee
*Assistant Examiner* — Zhipeng Wang
(74) *Attorney, Agent, or Firm* — Blakely, Sokoloff, Taylor & Zafman LLP

(57) ABSTRACT

Techniques to tie a processor power state transition on a platform to another power state transition on the platform. In an embodiment, processor governor functionality of an operating system detects an idle condition of a processor executing the operating system. Based on the processor idle condition and one or more indicated conditions of other platform devices, tying logic may determine a system power state to transition the platform to. For example, the tying logic may select from one of a plurality of idle standby system power states.

30 Claims, 4 Drawing Sheets

METHOD, APPARATUS AND SYSTEM TO TRANSITION SYSTEM POWER STATE OF A COMPUTER PLATFORM

PRIORITY

This application claims priority to India Patent Application No. 3083/DEL/2010, filed Dec. 23, 2010.

BACKGROUND

1. Technical Field

Embodiments generally relate to power management for devices of a computer platform. More particularly, certain embodiments provide for a method tying a processor power state transition on a platform to another power state transition of the platform.

2. Background Art

In existing computer platforms, operating systems (OS) variously support power management techniques which are specific to a particular processor—e.g. with traditional Advanced Configuration and Power Interface (ACPI)-based mechanisms. For example, current OS power management (OSPM) mechanisms provide for transitioning a platform processor core to a processor-specific, idle processor power state such as a C6 power state.

The introduction of autonomous device power management has allowed such computer platforms to increasingly rely on drivers for various types of devices that independently manage transitions between device-specific power states, each for their own respective platform device.

However, to date, the transitioning of a platform's processor to a particular processor-specific power state has been independent of any transitioning of other types of devices of the platform to their respective device-specific power states. For example, existing OS power management (OSPM) mechanisms do not to facilitate any correlating of a processor power state transition to another power state transition on the platform, where the other power state transition is specific to, or inclusive of, transitioning power state of another—e.g. non-processor—type of platform device.

By relying on separate power management determinations and their corresponding separate platform state transitions—e.g. a processor-specific power state transition and a separate (extra-processor) device power state transition—existing computer platform power management techniques fail to account for possible opportunities to avail of more efficient power states from the perspective of the computer platform as a whole.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments variously provide for techniques to tie together a processor-specific power state transition for a platform's processor with a power state transition for one or more other devices on the platform. Such tying of transitions provides opportunities to recognize and implement more efficient, platform-wide power states.

In an embodiment, power management functionality for a platform is provided, e.g. by a processor governor of an OS which executes on a processor of the platform. The processor governor may detect for, and respond to, an idleness condition of the processor executing the OS. For example, in response to an indication of some current or expected processor idleness, the processor governor may initiate a transition of the processor to an idle power state such as C6 (or lower power state). The response of the processor governor to the indicated processor idleness may include initiating a platform-wide system power state transition, of which the processor-specific power state transition is only one component part.

By way of illustration and not limitation, the processor governor may indicate to a system governor of the platform the entry of the processor into the processor idle power state. The system governor may, for example, include functionality to identify power state information which is specific to one or more devices of the platform other than the processor. Alternatively or in addition, the system governor may include, or otherwise have access to, one or more device drivers or similar logic to implement device-specific power state transitions—e.g. based on the identified device-specific power state information.

In an embodiment, the platform includes tying logic to tie the transition of the processor to a processor-specific power state with transitions of one or more other platform devices to respective device-specific power states. For example, the tying logic may opportunistically perform such tying in response to identifying the availability of a platform-wide system power state transition which includes transitions of multiple platform device's respective device power states.

Figure 1:
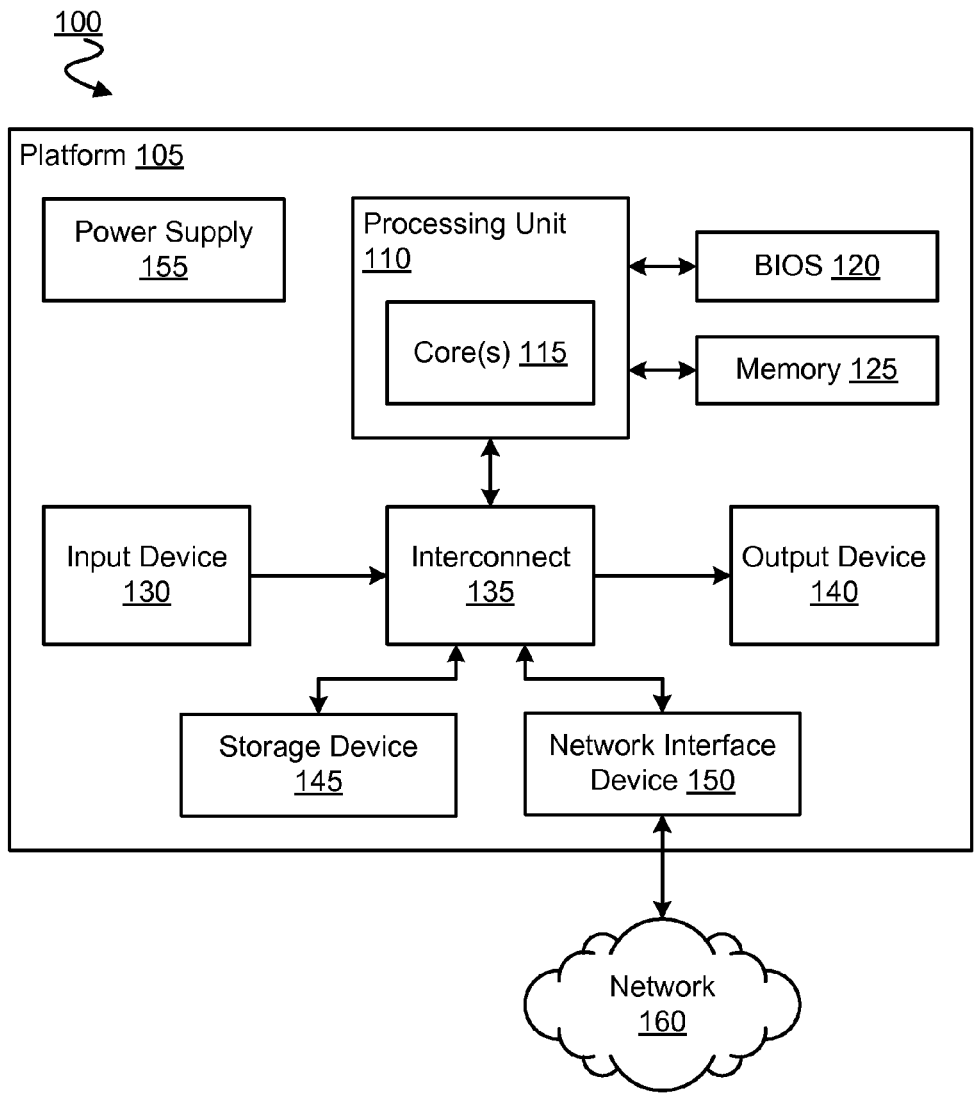
FIG. 1 is a block diagram illustrating select elements of a system for implementing power management according to an embodiment.

FIG. 1 illustrates select elements of a computer system 100 according to certain embodiments. System 100 may include a platform 105 having a power supply 155 for variously providing power to one or more components of platform 105. Although the scope of the various embodiments is not limited in this respect, platform 105 may include one or more of a personal computer (PC), a personal digital assistant (PDA), an Internet appliance, a cellular telephone, a laptop computer, a tablet device, a mobile unit, a wireless communication device and/or any other such computing device including mechanism for implementing power management.

According to illustrative embodiments, platform 105 may include a processing unit 110 directly or indirectly coupled to one or more other components—e.g. a memory 125 and a system interconnect 135. Memory 125 may include a dynamic random access memory (DRAM), a non-volatile memory, or the like. In one example, memory 125 may store a software program which may be executed by processing unit 110. Additionally or alternatively, processing unit 110 may have access to Basic Input/Output System (BIOS) instructions 120—e.g. stored in memory 125 or in a separate storage device.

Processing unit 110 may be variously coupled to components of platform 105 via one or more address and/or data busses. It should be understood that interconnects other than or in addition to such busses may be used to connect processing unit 110. For example, one or more dedicated data and/or control lines, crossbars, etc. may be used to connect processing unit 110 to memory 125 or other devices, according to different embodiments.

As discussed below, processing unit 110 may include one or more cores 115 to execute an operating system (OS), not shown. In various embodiments, the executing OS may implement one or more features—e.g. an Advanced Configuration and Power Interface (ACPI) and/or operating system power management (OSPM) code—to variously provide management of power distribution by power supply 155. In addition, processing unit 110 may include a cache memory (not shown), such as, for example, static random access memory (SRAM) and the like, or any of a variety of types of internal integrated memory.

Interconnect 135 may coupled various components of platform 105 to one another for various exchanges of data and/or control messages. By way of illustration and not limitation, interconnect 135 may include one or more of an Ethernet interface, a Universal Serial Bus (USB) interface, a Peripheral Component Interconnect interface, and the like. Additionally or alternatively, interconnect 135 may represent circuitry to control various components interconnected thereby. For example, interconnect 135 may include one or more controller hubs such as an I/O controller hub, a platform controller hub, a memory controller hub, and/or the like.

In order to illustrate various features of certain embodiments, interconnect 135 is shown coupling processing unit 110 to an input device 130 for receiving communications at platform 105, an output device 140 for sending communications from platform 105 and a storage device 145 for storing data in platform 105. By way of illustration and not limitation, either or both of input device 130 and output device 140 may include one or more of a keyboard, keypad, mouse, touchpad, touch screen, display, biometric device, and the like. Storage device 145 may include one or more of a hard disk drive (HDD), solid state drive (SSD), compact disk (CD) drive, digital versatile disk drives (DVD), and/or other computer media input/output (I/O) devices. In an embodiment, one or more of input device 130, output device 140 and storage device 145 may be external, and coupled, to platform 105—e.g. as various devices peripheral to platform 105.

It is understood that any of a variety of additional or alternative devices, circuit blocks, etc. of platform 105 may be coupled to processing unit 110, according to various embodiments. It is also understood that the particular architecture of platform 105—e.g. the relative configuration of devices, circuit blocks, etc. of platform 105 with respect to processing unit 110—is not limiting on certain embodiments.

According to illustrative embodiment, system 100 may exchange data with other devices via a connection to a network 160. For example, platform 105 may include a network interface device 150 to exchange network traffic with network 160. The network connection may include any type of network connection, such as an Ethernet connection, a digital subscriber line (DSL), a telephone line, a coaxial cable, etc. Network 160 may be any type of network, such as the Internet, a telephone network, a cable network, a wireless network such as, for example, a network complying IEEE standard 802.11, 1999 include one or more IEEE 802.11 related standards, IEEE 802.16 Standard for Wireless Metropolitan Area Networks and/or the like.

According to one exemplary embodiment, processing unit 110—e.g. a processing core 115 of processing unit 110—may operate at different times in two or more processor power states. Platform 105 may provide hardware and/or software means to support, initiate, or otherwise implement transitions of the processor core 115 between such processor power states.

Figure 2:
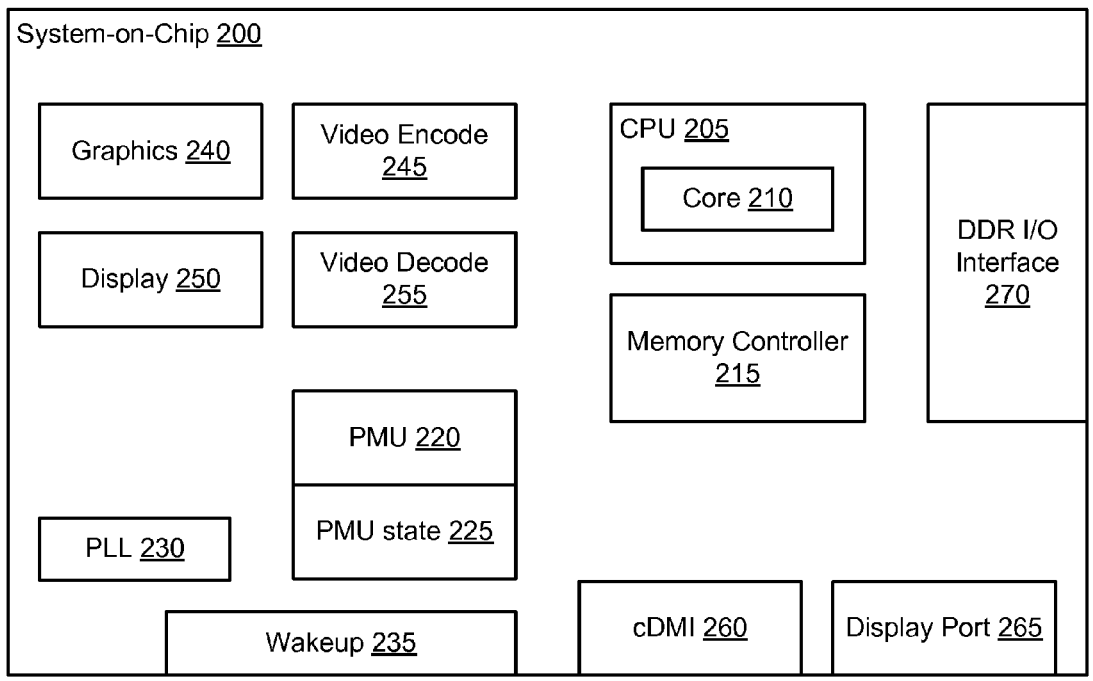
FIG. 2 is a block diagram illustrating select elements of a system-on-chip for performing a system power state transition according to an embodiment.

FIG. 2 illustrates select elements of a system-on-chip (SoC) 200 for implementing a transition of a system power state for a computer platform, according to an embodiment. SoC 200 may, for example, include some or all of a set of device of platform 105 which are subject to power management mechanisms that, in an embodiment, tie a processor power state transition to another power state transition of one or more other platform devices.

SoC 200 may include one or more processors, such as a CPU 205 having at least one processor core 210. It is understood that CPU 205 may, in an alternate embodiment, reside outside of one or any SoC of a platform—e.g. in a separate single- or multi-core CPU IC chip. Processor core 210 may be variously coupled to one or more other platform devices—e.g. including components which reside on, or off of, SoC 200.

SoC 200 may provide power management for CPU 205, one or more other component devices of SoC 200, and/or one or more other platform devices (not shown) which are coupled to SoC 200. For example, processor core 210 may execute an OS providing OS power management (OSPM) functionality. Alternatively or in addition, SoC 200 may include a power management unit (PMU) 220 to variously detect, determine or otherwise provide data and/or control messages to monitor and/or control power characteristics for devices of SoC 200 and/or platform devices (not shown) coupled to SoC 200. For example, PMU 225 may receive, generate or otherwise have access to PMU state information 225 for power management of core 210 and/or one or more other platform devices. In an embodiment, power management of processor core 210 may be tied to power management of one or more other devices of SoC 200—and/or of one or more platform devices external to SoC 200—which variously operate in conjunction with processor core 210.

Such power management may extend to any of a variety of combinations of platform devices. By way of illustration and not limitation, SoC 200 may include a graphics module 240 having circuitry or other logic to perform rendering calculations or other processing of graphics data. Alternatively or in addition, SoC 200 may include video encode module 245 and/or video decode module 255—e.g. to process video data exchanged between platforms. Alternatively or in addition, SoC 200 may include a display module 250 having interface, driver or other circuitry/logic for providing video information to a display—e.g. via a display port 265 of SoC 200. Moreover, SoC 200 may additionally or alternatively include a memory controller 215 including circuitry or other logic to manage access to data storage devices of a platform on which SoC 200 resides.

Additionally or alternatively, SoC 200 may variously include one or more means for receiving and/or sending clock, power, data, control or other signals. By way of illustration and not limitation, SoC 200 may include a phase lock loop (PLL) module 230 for SoC 200 to receive, process and/or distribute one or more clock signal to various component devices. SoC 200 may include a wakeup module 235 having circuitry or other logic to detect for an input signal indicating a wakeup event for transitioning circuitry out of low-power state. Additionally or alternatively, SoC 200 may include a cloud data management interface (cDMI) 260, double data rate (DDR) I/O interface 270, display port 265 and/or any of a variety of combinations of additional or alternative means for SoC 200 to receive and/or send various clock, power, data, control or other signals, according to various embodiments.

In various embodiments, some or all of the components of SoC 200 coupled to processor core 210 may, in various alternate embodiments, reside separate from one or any SoC of a platform. Also, it is understood that the combination and/or configuration of such other coupled components of SoC 200 is merely illustrative, and that SoC 200 may, according to different embodiments, include any of a variety of combinations of one or more additional or alternative components coupled to processor core 210.

Figure 3:
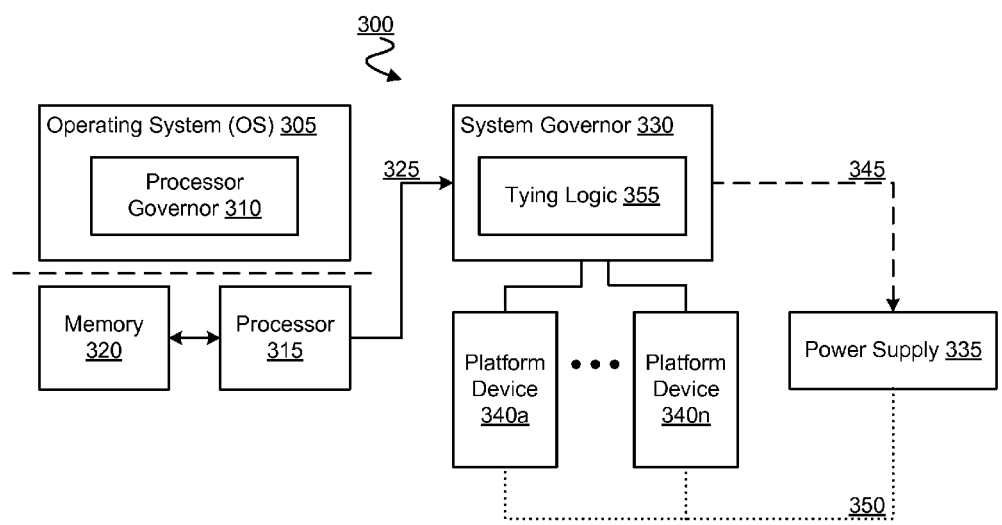
FIG. 3 is a block diagram illustrating select elements of a platform for tying a processor power state transition to another power state transition according to an embodiment.

FIG. 3 illustrates select elements of a platform 300 to transfer between system power states according to an embodiment. Platform 300 may include some or all of the features of platform 105, for example. In an embodiment, some of all of the devices shown in FIG. 3 may reside on a single SoC—e.g. SoC 200.

Platform 300 may include an OS 305 which, for example, executes with a processor 315 and a memory 320. OS 305 may include a processor governor 310—e.g. a set of executing OS instructions which operate to govern power states of processor 315. In an embodiment, processor governor 310 may evaluate, identify or otherwise detect one or more processor idleness conditions of processor 315. By way of illustration and not limitation, processor governor 310 may at least implement functionality such as that of a CPUIDLE governor routine of a Linux OS. Alternatively or in addition, the processor governor 310 may use other OS power management (OSPM) techniques for processor idle detection and response—e.g. according to an Advanced Configuration and Power Interface (ACPI) standard such as ACPI Revision 4.0a, released Apr. 5, 2010.

By way of illustration and not limitation, processor governor 315 may execute to calculate, receive an indication of, or otherwise detect a level (and/or type) of current processor idleness, current rate of change of processor idleness, expected future processor idleness, expected future rate of change of processor idleness, and/or the like. It is understood that detecting an idle state of a processor may include detecting a corresponding load state of the processor.

For example, OS 305 may include or otherwise have access to a scheduler (not shown) which looks to schedule a next operation, thread, etc. for the OS 305 to execute. Processor governor 310 may detect that the scheduler for OS 305 has determined that there is, or is expected to be, a condition in which no ready operation or thread is scheduled for execution.

Based on a detecting of a current or expected future processor idle condition, processor governor 310 may determine that the idle condition represents an opportunity to transition processor 315 to a particular processor-specific power state—e.g. a processor idle power state such as C6 (or lower processor power state). In response to identifying such an opportunity, processor governor 310 may initiate such a power state transition by signaling a C-state driver of the OS, or through any of a variety of alternate techniques for idling a processor—e.g. according to existing ACPI mechanisms.

In an embodiment, the response to a detected idle condition of processor 315 may include processor governor 310 initiating a system power state transition—e.g. of which the processor power state transition for processor 315 is just one element.

By way of illustration and not limitation, executing functionality of processor governor 310 may cause processor 315 to generate a message 325 indicating entry of processor 315 into a particular processor power state—e.g. a C6 or other processor idle power state.

Message 325 may be received by tying logic 355—e.g. in a system governor 330 of platform 300, where system governor 330 includes hardware and/or software means for implementing device-specific power management for one or more devices of platform 300 other than processor 315. By way of illustration and not limitation, system governor 330 may be coupled to one or more other platform devices 340a, . . . , 340n, or otherwise have access to platform state information, to determine whether the one or more platform devices 340a, . . . , 340n are in, or are expected to enter, a sufficiently quiescent level of activity for an idle standby system power state. System governor 330 may, for example, get notification of a screen saver timeout, network stack inactivity, inactivity of a sub-process running below a currently executing application, or any of a variety of additional or alternative indicators of platform inactivity for individual devices. It is understood that tying logic 355 may reside in power management means external to system governor 300, according to various embodiments.

In an embodiment, system governor 330 is a functionality executing on OS 305. Alternatively or in addition, system governor 330 may be implemented outside of OS 305 by other platform power management logic—e.g. a power management unit such as PMU 220. System manager 330 may be tightly coupled to processor-specific or other power management functionality of OS 305. For example, system manager 330 may include or have access to a dedicated channel and/or protocol for direct power management communication with OS 305. In an embodiment, system governor 330 has visibility into metrics for platform 300 which are used to determine what system power state platform 300 might enter at various times. Moreover, system governor 330 may have power management features which implement the level of granularity supporting multiple different system idle states.

Based on message 325 and on other state information which system governor 330 has detected pertaining to one or more other platform devices of platform 300, tying logic 330 may identify whether entry of processor 315 into a processor idle power state is opportunistic of additional, device-specific power state transitions—e.g. in support of implementing an aggregate system power state transition for platform 300 as a whole. In response to identifying such a system power state transition, tying logic 330 may direct mechanisms (not shown) which are included in, or otherwise accessible to, system governor 330—e.g. one or more device drivers, clock gating logic, power gating logic, a PMU, etc.—to implement the system power state transition. Such direction may include, for example, system governor 330 sending a control signal 345 to regulate the providing 350 from power supply 335 to one or more platform devices 340a, . . . , 340n of the various levels/frequencies/etc. for voltage, current or other signals.

Figure 4:
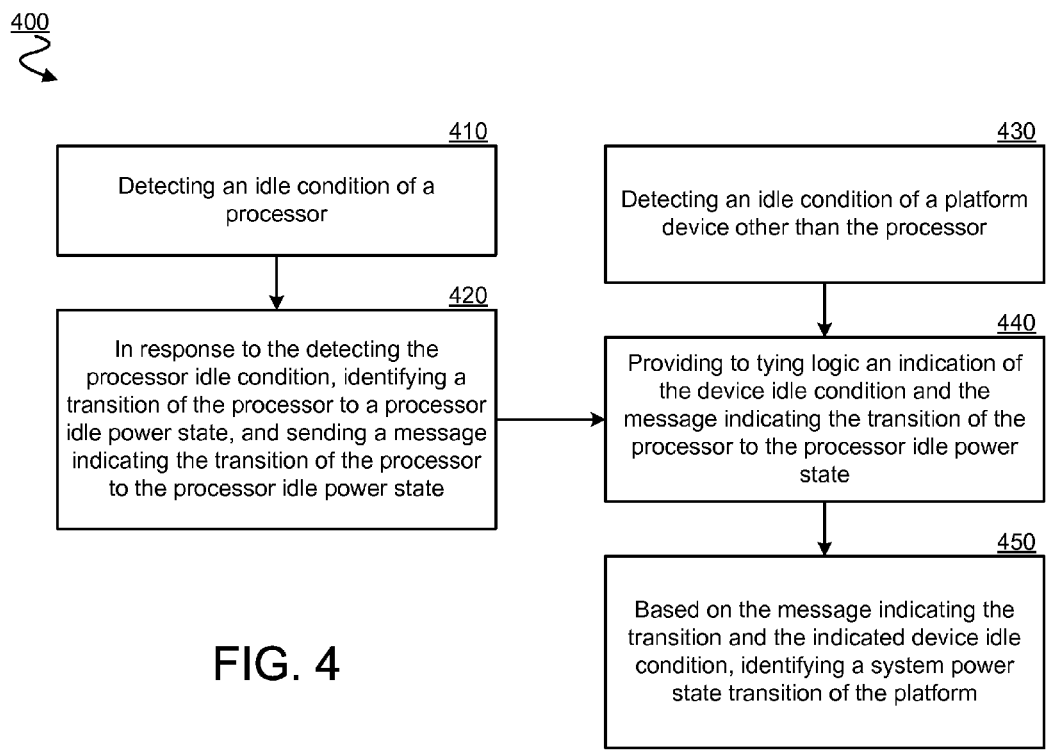
FIG. 4 is a block diagram illustrating select elements of a method for identifying a system power state transition for a platform, according to an embodiment.

FIG. 4 illustrates select elements of a method 400 to identify a power state transition for a computer platform according to an embodiment. Method 400 may be performed, for example, by platform 300. More particularly, method 400 may be performed by platform entities exhibiting respective functionalities such as those of OS 305, system governor 330 and tying logic 355 (which may be included in, or external to, system governor 330).

In method 400, a processor governor of an OS may detect, at 410, an idle condition of a processor executing the OS. In response to the detecting of the processor idle condition, the processor governor may identify, at 420, a transition of the processor to a processor idle power state. Moreover, the response to detecting the processor idle condition may include the processor governor causing a message to be sent which indicates the determined transition of the processor to the processor idle power state.

In conjunction with the above-described operations of the processor governor, method 400 may include, at 430, a system governor detecting an idle condition of a platform device other than the processor. Various embodiments are not limited as to when the detecting at 430 might occur in relation to the operations 410, 420. The tying logic may receive, at 440, an indication of the detected device idle condition and the message indicating the determined transition of the processor to the processor idle power state.

Based on message indicating the determined transition of the processor to the processor idle power state and the indicated device idle condition, method 400 may, at 450, identify a system power state transition of the platform.

In an embodiment, identifying the system power state transition may include selecting from one of a plurality of idle standby system power states a preferred system power state to transition to. As used herein, an idle standby system power state refers to a combination of concurrent power states, each for a respective platform device, where the combination includes an idle power state specific to a platform processor—e.g. a particular processor core of a platform CPU.

Table 1 below includes a listing of component device power states for each of two illustrative idle standby system power states, according to an embodiment.

TABLE 1

Component Power States for Various Idle Standby System Power States

| Platform Component/ Device | S0: C0-C6 | First Idle Standby System Power State | Second Idle Standby System Power State |
|---|---|---|---|
| Wake Logic | ON | ON | OFF |
| DDR | ON/SR | SR | SR |
| PMU | ON | ON | OFF |
| Graphics | ON/Power-Gated | Power-Gated | OFF |
| Video Decode | ON/Power-Gated | Power-Gated | OFF |
| Video Encode | ON/Power-Gated | Power-Gated | OFF |
| Display Controller | ON/Power-Gated | Power-Gated | OFF |
| I/O Hub Links | ON/Power-Gated | Power-Gated | OFF |
| CPU | C-State dependent | C6 | OFF |
| Display | ON | OFF | OFF |

It is understood that any of a variety of additional or alternate idle standby system power states may be implemented, in various embodiments.

The identifying 450 may be based on the condition that each of a plurality of candidate idle standby system power state is associated with one or more respective performance benefits and/or disadvantages. For example, implementing a particular idle standby system power state may result in a particular power saving, while at the same time requiring a particular power state entry and/or recovery latency.

In an embodiment, the identifying 450 may seek a system power state which provides the most power savings without requiring too great a power state transition latency, or without otherwise violating some performance constraint. By way of illustration and not limitation, tying logic may identify—e.g. from a processor governor or a system governor—an expected idle residency for a processor or other platform device. The expected idle residency may indicate, for example, a period of time before a next operation is expected to be ready for a particular platform device to handle. In an embodiment, expected idle residency may be compared to, or otherwise evaluated based on, a power state entry (or recovery) latency to eliminate any unacceptable idle standby system power states.

Another level of policy for implementing the identifying 450 may include determining whether any remaining, acceptable idle standby system power states can be transitioned to without preventing some required access to a platform resource. For example, if transitioning to a particular system power state would affect management of some shared platform resource (e.g. particular voltage rails, PLLs, etc.), then the tying logic may make sure that platform devices sharing such resources would each be in an appropriate power state to tolerate the effect on shared resource access. Any unacceptable restraints to accessing shared platform resources may further eliminate one or more additional candidate system power states as unacceptable.

Still another level of policy for implementing the identifying 450 may include determining whether any remaining candidate system power states would violate device-specific quality of service (QoS) requirements. If any candidate system power states remain which are not identified as being unacceptable, the tying logic may identify the system power state to transition to—e.g. by selecting an acceptable system power state which offers the comparatively greatest power savings.

Techniques and architectures for computer platform power management are described herein. In the description herein, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), erasable programmable read only memories (EPROMs), electrically EPROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method performed by a computer platform, the method comprising:
    with an operating system (OS) executing on a processor of the computer platform:
        detecting a processor idle condition of the processor; and
        in response to the detecting the processor idle condition:
            identifying a transition of the processor to a processor idle power state, and
            sending to tying logic of the computer platform a message indicating the transition of the processor;
    providing to the tying logic an indication of an idle condition of a device of the computer platform other than the processor; and
    in response to both the message indicating the transition of the processor and the indication of the idle condition of the device, the tying logic identifying an opportunity to transition the computer platform to a first system idle power state including the processor being in the processor idle power state and the device being in a first device power state; and
    in response to identifying the opportunity to transition the computer platform to the first system idle power state, the tying logic signaling a driver process for the device to transition the device to the first device power state.

2. The method of claim 1, wherein a processor governor of the OS performs the detecting the processor idle condition.

3. The method of claim 1, wherein a system governor performs the providing the indication of the idle condition of the device of the computer platform other than the processor.

4. The method of claim 1, wherein the tying logic receives an indication of a performance parameter, and wherein the identifying the opportunity is further in response to the indication of the performance parameter.

5. The method of claim 4, wherein the performance parameter includes one or more of an expected idle residency and a quality of service.

6. The method of claim 1, wherein identifying the opportunity to transition the computer platform to the first system idle power state includes selecting the first system idle power state from a plurality of system idle power states.

7. A non-transitory computer readable storage medium comprising instructions stored thereon which, when executed by one or more processors, cause the one or more processors to:
    with an operating system (OS):
        detect a processor idle condition of the processor; and
        in response to detecting the processor idle condition:
            identify a transition of the processor to a processor idle power state, and
            send to tying logic a message indicating the transition of the processor;
    provide to the tying logic an indication of an idle condition of a device of the computer platform other than the processor; and
    in response to both the message indicating the transition of the processor and the indication of the idle condition of the device, identify with the tying logic an opportunity to transition the computer platform to a first system idle power state including the processor being in the processor idle power state and the device being in a first device power state; and
    in response to identification of the opportunity to transition the computer platform to the first system idle power state, signal a driver process for the device to transition the device to the first device power state.

8. The non-transitory computer readable storage medium of claim 7, wherein a processor governor of the OS performs the detecting the processor idle condition.

9. The non-transitory computer readable storage medium of claim 7, wherein a system governor performs the providing the indication of the idle condition of the device of the computer platform other than the processor.

10. The non-transitory computer readable storage medium of claim 7, wherein the tying logic receives an indication of a performance parameter, and wherein the identifying the opportunity is further in response to the indication of the performance parameter.

11. The non-transitory computer readable storage medium of claim 10, wherein the performance parameter includes one or more of an expected idle residency and a quality of service.

12. The non-transitory computer readable storage medium of claim 11, wherein the quality of service includes a latency tolerance.

13. The non-transitory computer readable storage medium of claim 7, wherein identifying the opportunity to transition the computer platform to the first system idle power state includes selecting the first system idle power state from a plurality of system idle power states.

14. The non-transitory computer readable storage medium of claim 13, wherein selecting the first system idle power state from the plurality of system idle power states is based on one or more performance metrics associated with the first system idle power state.

15. The non-transitory computer readable storage medium of claim 14, wherein the one or more performance metrics includes a latency and a transitional cost.

16. The non-transitory computer readable storage medium of claim 14, wherein selecting the first system idle power state from the plurality of system idle power states further includes identifying whether transitioning to the first system idle power state would prohibit a required utilization of a shared resource of the computer platform.

17. An apparatus comprising:
first logic to detect a processor idle condition of a processor and in response to detection of the processor idle condition:
to identify a transition of the processor to a processor idle power state, and
to send a message indicating the transition of the processor;
second logic to detect an idle condition of a device of the computer platform other than the processor and to provide indication of the detected idle condition of the device; and
third logic to identify, in response to both the message indicating the transition of the processor and the indication of the idle condition of the device, an opportunity to transition the computer platform to a first system idle power state including the processor being in the processor idle power state and the device being in a first device power state, and, in response to identification of the opportunity to transition the computer platform to the first system idle power state, the third logic further to signal a driver process for the device to transition the device to the first device power state.

18. The apparatus of claim 17, wherein the first logic includes a processor governor of an operating system (OS) executing on the processor.

19. The apparatus of claim 17, wherein the second logic includes a system governor.

20. The apparatus of claim 19, wherein the system governor resides in a power management unit.

21. The apparatus of claim 19, wherein the system governor receives an indication of a performance parameter, and wherein identification of the opportunity is further in response to the received indication of the performance parameter.

22. The apparatus of claim 21, wherein the performance parameter includes one or more of an expected idle residency and a quality of service.

23. The apparatus of claim 22, wherein the quality of service includes a latency tolerance.

24. The apparatus of claim 17, wherein the third logic to identify the opportunity to transition the computer platform to the first system idle power state includes the third logic to select the first system idle power state from a plurality of system idle power states.

25. A system comprising:
first logic to detect a processor idle condition of a processor and in response to detection of the processor idle condition:
to identify a transition of the processor to a processor idle power state, and
to send a message indicating the transition of the processor;
second logic to detect an idle condition of a device of the computer platform other than the processor and to provide indication of the detected idle condition of the device;
third logic to identify, in response to both the message indicating the transition of the processor and the indication of the idle condition of the device, an opportunity to transition the computer platform to a system idle power state including the processor being in the processor idle power state and the device being in a first device power state, and, in response to identification of the opportunity to transition the computer platform to the first system idle power state, the third logic further to signal a driver process for the device to transition the device to the first device power state; and
an antenna to couple the system to a network.

26. The system of claim 25, wherein the first logic includes a processor governor of an operating system (OS) executing on the processor.

27. The system of claim 25, wherein the second logic includes a system governor.

28. The system of claim 27, wherein the system governor resides in a power management unit.

29. The system of claim 27, wherein the system governor receives an indication of a performance parameter, and wherein identification of the opportunity is further in response to the received indication of the performance parameter.

30. The system of claim 25, wherein the third logic to identify the opportunity to transition the computer platform to the first system idle power state includes the third logic to select the first system idle power state from a plurality of system idle power states.

* * * * *